United States Patent Office 3,128,542
Patented Apr. 14, 1964

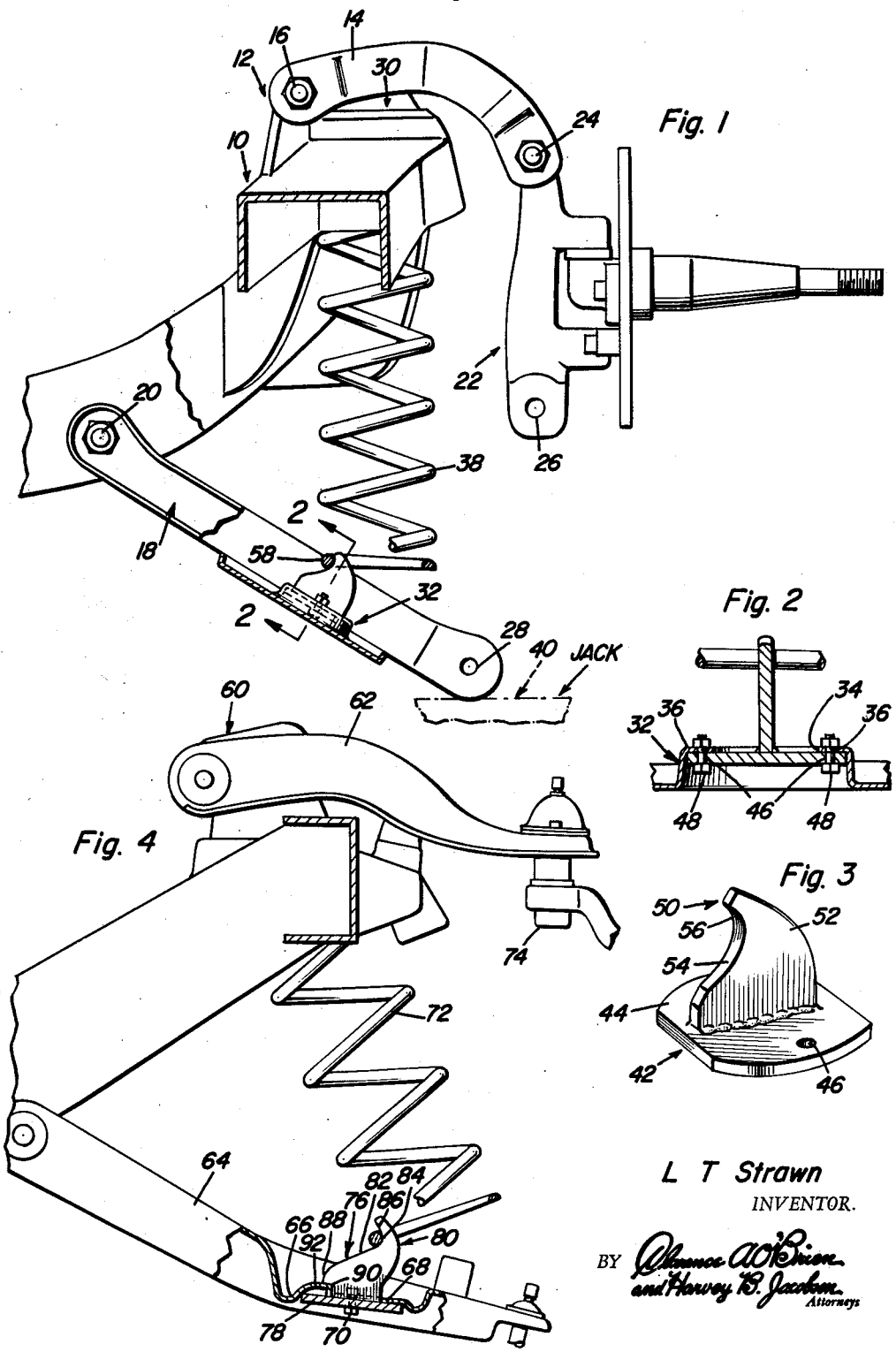

3,128,542
TOOL FOR INSTALLING VEHICLE COIL SPRINGS
L T Strawn, Aztec, N. Mex.
(1310 Lincoln Ave., Farmington, N. Mex.)
Filed Sept. 5, 1961, Ser. No. 135,978
5 Claims. (Cl. 29—227)

This invention relates to a novel and useful tool designed specifically to assist in installing coil springs in the front suspension system of vehicles which include a pair of upper and lower spring seats carried by the frame and a lower control arm of the vehicle respectively.

The outer end of the lower control arm is normally connected to the outer end of the upper control arm by means of a steering knuckle support and it is necessary to disconnect the outer end of the lower control arm and to drop the outer end of the latter downwardly away from the upper seat carried by the frame of the vehicle in order that a replacement spring may be positioned between the two spring seats which have been moved apart without axially compressing the coil spring. Then, with the coil spring properly positioned between the spring seats which have been moved apart beyond their normal spatial relationship, the outer end of the lower control arm is jacked upwardly to its normal position and resecured to the lower end of the steering knuckle support.

Although it is possible to install a front coil spring in the manner above set forth without the use of the tool of the instant invention, the lower end of the coil spring, when the lower control arm is lowered is laterally offset from the lower spring seat carried by the lower control arm. In some instances it is next to impossible to maintain sufficient side thrust on the lower end of the coil spring during the process of jacking the outer end of the lower control arm upwardly for resecurement to the steering knuckle support.

The main object of this invention is to provide a coil spring replacing tool which may be removably secured to the lower control arm adjacent the lower spring seat carried thereby and which is provided with cam means for engagement with the laterally offset lower end portion of the compression spring and for automatically camming the lower end of the coil spring inwardly toward proper seating engagement with the lower spring seat upon movement of the free end of the lower control arm upwardly into its normal position for resecurement to the steering knuckle support.

A further object of this invention, in accordance with the immediately preceding object, is to provide a coil spring replacing tool having a base portion adapted for securement to the undersurface of the lower control arm and provided with cam means adapted to extend upwardly through the centrally apertured lower spring seat carried by the lower control arm and to engage the adjacent portion of the lowermost convolution of a coil spring for preventing movement of the lower end of the spring away from the spring seat upon upward movement of the free end of the lower control arm towards its normal position for engagement with the steering knuckle support.

A further object of this invention, in accordance with the preceding object, is to provide cam means which will automatically, upon upward movement of the free end of the lower control arm cam the lower end of the coil spring inwardly toward seating engagement with the lower spring seat carried by the lower control arm.

Still another object of this invention is to provide a coil spring replacing tool in accordance with the preceding objects which may be readily modified for use in connection with different types of vehicles using somewhat different coil spring suspension systems.

A final object of this invention to be specifically enumerated herein is to provide a coil spring replacing tool in accordance with the preceding objects which will conform to conventional forms of manufacture, be of simple construction and easy to use so as to provide a device that will be economically feasible, long lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary elevational view of a portion of a conventional type of vehicle front wheel suspension assembly utilizing a pair of upper and lower control arms pivotally secured to the frame of the vehicle at their inner ends and interconnected at their outer ends by means of a steering knuckle support and having a coil spring disposed between the upper and lower spring seats carried by the vehicle frame and the lower control arm respectively with the lower control arm disconnected at its outer end from engagement with the steering knuckle support and dropped downwardly away from the upper spring seat and the tool of the instant invention mounted upon the lower control arm and operatively engaged with the lowermost convolution of the coil spring for camming the latter inwardly toward the frame and to the left as viewed in FIGURE 1 upon raising of the outermost end of the lower control arm by means of a jack to its normal position in engagement with the steering knuckle support;

FIGURE 2 is a fragmentary enlarged sectional view taken substantially upon the plane indicated by the section line 2—2 of FIGURE 1;

FIGURE 3 is a perspective view of the tool illustrated in FIGURES 1 and 2; and

FIGURE 4 is a fragmentary elevational view of a modified form of front wheel suspension assembly similar to that of FIGURE 1 but utilizing a suspension assembly having the coil spring thereof downwardly and outwardly inclined and showing a modified form of tool operatively connected to the lower control arm of the modified suspension assembly and the coil spring thereof.

Referring now more specifically to the drawings the numeral 10 generally designates a conventional type of vehicle frame such as that used in the manufacture of Ford vehicles. The front suspension assembly of the vehicle frame is generally referred to by the reference numeral 12 and includes an upper control arm 14 which is pivotally secured to the frame 10 as at 16 and a lower control arm generally referred to by the reference numeral 18 which is pivotally secured to the frame 10 as at 20. An elongated and upstanding steering knuckle support generally referred to by the reference numeral 22 is pivotally secured at its upper end to the outer end of the upper control arm 14 as at 24 and is provided with an opening 26 at its lower end adapted for alignment with an opening 28 formed in the outer end of the lower control arm 18 for pivotally securing the lower end of the steering knuckle support 22 to the outer end of the lower control arm 18.

The frame 10 includes a spring housing portion generally referred to by the reference numeral 30 in which there is disposed a downwardly facing upper spring seat (not shown). The lower control arm 18 includes a spring seat generally referred to by the reference numeral 32 which faces upwardly and it will be noted that the spring seat 32 has a centrally disposed aperture 34 formed therein and is also provided with a pair of openings 36 which are spaced about the centrally disposed aperture 34. It will be noted that the openings 36 are utilized to receive fasteners by which the cross head of the lower end of an airplane type shock absorber is secured to the spring seat 32.

As can be seen from FIGURE 1 of the drawings in order to install a replacement coil spring 38 it is necessary to disconnect the outer end of the lower control arm 18 from the lower end of the steering knuckle support 22 and drop the outer end of the lower control arm. Then, the coil spring 38 may be disposed between the upper and lower spring seats in an uncompressed state. However, when the upper end of the coil spring 38 is disposed in the spring housing portion 30 and in seated engagement with the upper spring seat (not shown), it will be noted that the insertion of the upper end of the coil spring 38 within the spring housing portion 30 maintains the coil spring 38 in a substantially vertically disposed position wherein its lower end is laterally offset outwardly of the lower spring seat 32. Inasmuch as the coil spring 38 is quite stiff, it is next to impossible to manually laterally deflect the lower end of the spring 38 inwardly while the outer end of the lower control arm 18 is raised by the jack 40.

The coil spring replacing tool of the instant invention is generally referred to by the reference numeral 42 and includes a base portion 44 which is substantially plate-like and is generally circular and has a pair of apertures 46 formed therethrough for registry with the openings 36. Baffles 48 may be utilized to secure the base portion 44 to the undersurface of the spring seat 32 in underlying relation to the aperture 34.

The tool constitutes a cam member of which the base 44 comprises a part and also includes camming abutment means generally referred to by the reference numeral 50 comprising a cam portion in the form of an upright 52 secured to the base portion 44 and projecting from the upper face thereof. The cam portion of upright 52 includes an upwardly inclined surface 54 which terminates at its upper end in an upwardly directed hook portion 56. The upwardly inclined surface 54 is slightly concave and the hook portion 56 is formed by an upwardly smoothly curved upper extension of the inclined surface 54 which terminates at its free end in a plane substantially at right angles to the lower end of the inclined surface 54.

The upper end of the inclined surface 54 and the hook portion 56 are engaged with the lowermost convolution 58 of the coil spring 38 and the portion thereof adjacent the frame 10. Then, the jack 40 may be raised whereupon the resiliency of the spring 38 will urge the lowermost convolution 58 downwardly along the inclined surface 54 as the tool 42 is swung about the axis of rotation of the lower control arm 18 relative to the frame 10.

It will be noted that when the outer end of the control arm 18 is in its lowered position for receiving the coil spring 38 in its normal state between the upper and lower spring seats, the inclined surface 54 is disposed at substantially right angles to the longitudinal axis of the coil spring 38.

With attention now directed to FIGURE 4 of the drawings it will be seen that a modified form of vehicle suspension assembly which is generally referred to by the reference numeral 60 and is similar to the front wheel suspension assembly 12 in that it includes an upper control arm 62 and a lower control arm 64 which is provided with an upwardly facing spring seat 66 provided with a centrally disposed aperture 68 about which openings (not shown) for the reception of fasteners 70 are formed similar to openings 46. However, it will be noted that the coil spring 72 of the suspension assembly 60 is, when the steering knuckle support 74 is secured between the outer ends of the upper and lower control arms 62 and 64, normally disposed in a downwardly and outwardly inclined position. Accordingly, the modified form of tool generally referred to by the reference numeral 76 must be formed somewhat differently than the tool 42. However, the base portion 78 is substantially identical to the base portion 44. The only difference between the tool 42 and the tool 76 is that the upright generally referred to by the reference numeral 80 is provided with a substantially straight upwardly inclined surface 82 which is disposed at substantially a 45° angle to the base portion 78. The upper end of the inclined surface 82 is sharply curved as at 84 and terminates in a right angled hook portion 86. Further, it will be noted that the lower end of the inclined surface 82 terminates in a downwardly curved surface 88 terminating at its lower end in a notch 90 which receives the raised hump 92 formed in the spring seat 66 of the lower control arm 64.

Accordingly, it may be seen that the operation of the tool 76 is substantially identical to the operation of the tool 42 but that the inclined surfaces and hook portions of the tools 42 and 76 must be formed in a slightly different manner in order to enable the tools 42 and 76 to be adapted for installing coil springs of various types of front wheel suspension assemblies.

It will be noted that other slight modifications of the upright as well as the base of the coil spring installing tool may be made in order to adapt the tool specifically for one type of vehicle without departing from the spirit of the instant invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with a vehicle wheel suspension assembly of the type including a front coil spring disposed between upper and lower spring seats of a vehicle carried by the frame and a lower control arm of the vehicle respectively, said assembly also including an upper control arm, said control arms being pivotally secured to the frame at their inner ends and interconnected at their outer ends by means of a steering knuckle support; a tool for assisting in the placement and securement of said coil spring between said seats after the outer end of the lower control arm has been disconnected from the steering knuckle support and said lower control arm has been swung downwardly at its free outer end away from its normal position engaged with said steering knuckle support and from said upper seat to position the upper and lower seats a sufficient distance apart to receive therebetween the coil spring in an uncompressed state whose lower end, when the upper end is engaged with said upper seat, is normally laterally offset outwardly of said lower seat, said tool comprising a cam member removably supported from said lower arm and including cam means engageable with the lower end of said spring to cam the lower end of said spring inwardly into proper seating engagement with said lower seat in response to upward movement of the outer end of said lower control arm toward its normal position secured to said steering knuckle support, said lower spring seat having a centrally disposed aperture formed therethrough, said cam means including a base portion removably secured to the undersurface of said lower control arm adjacent said aperture and a cam portion receivable upwardly through said aperture and defining said abutment means.

2. The combination of claim 1 wherein said base underlies said aperture, said lower control arm having a plurality of openings formed therethrough adjacent said aperture for receiving fasteners passed through the cross head carried by the lower end of an airplane type shock which is usually disposed concentrically within said coil spring, said base having a plurality of apertures formed therethrough aligned with said openings.

3. The combination of claim 2 wherein said cam portion comprises an upright secured to said base portion and including an upwardly inclined surface which terminates at its upper end in an upwardly directed hook portion, said surface and said hook portion comprising said abutment means.

4. The combination of claim 3 wherein said inclined surface is substantially straight and is adapted for initial engagement with said spring before said lower control arm is swung to its normal position with said inclined surface disposed at substantially right angles to the longitudinal axis of said spring.

5. In combination with a vehicle wheel suspension assembly of the type including a front coil spring disposed between upper and lower spring seats of a vehicle carried by the frame and a lower control arm of the vehicle respectively, said assembly also including an upper control arm, said control arms being pivotally secured to the frame at their inner ends and interconnected at their outer ends by means of a steering knuckle support; a tool for assisting in the placement and securement of said coil spring between said seats after the outer end of the lower control arm has been disconnected from the steering knuckle support and said lower control arm has been swung downwardly at its free outer end away from its normal position engaged with said steering knuckle support and from said upper seat to position the upper and lower seats a sufficient distance apart to receive therebetween the coil spring in an uncompressed state whose lower end, when the upper end is engaged with said upper seat, is normally laterally offset outwardly of said lower seat, said tool comprising a cam member removably supported from said lower arm and including cam means engageable with the lower end of said spring to cam the lower end of said spring inwardly into proper seating engagement with said lower seat in response to upward movement of the outer end of said lower control arm toward its normal position secured to said steering knuckle support, said lower spring seat having a centrally disposed aperture formed therethrough, said cam means including a base portion removably secured to the undersurface of said lower control arm adjacent said aperture and a cam portion receivable upwardly through said aperture and defining an abutment means, said base being underlying said aperture, said lower control arm having a plurality of openings formed therethrough adjacent said aperture for receiving fasteners passed through the cross head carried by the lower end of an airplane type shock which is usually disposed concentrically within said coil spring, said base having a plurality of apertures formed therethrough adapted for alignment with said openings, said cam portion comprising an upright secured to said base portion and including an upwardly inclined surface which terminates at its upper end in an upwardly directed hook portion, said surface and said hook portion comprising said abutment means, said inclined surface being smoothly curved upwardly into a hook portion disposed at substantially right angles to the lower end of said inclined surface.

References Cited in the file of this patent

UNITED STATES PATENTS

| | | |
|---|---|---|
| 371,205 | McConnoughay | Oct. 11, 1887 |
| 2,301,742 | Muller | Nov. 10, 1942 |
| 2,679,998 | Keller | June 1, 1954 |
| 2,687,867 | Wolar | Aug. 31, 1954 |
| 2,690,152 | Riccio | Sept. 28, 1954 |
| 3,057,640 | Soer | Oct. 9, 1962 |